United States Patent [19]

Robeson et al.

[11] Patent Number: 5,164,132
[45] Date of Patent: Nov. 17, 1992

[54] PROCESS FOR THE PRODUCTION OF ULTRA-FINE POLYMERIC FIBERS

[75] Inventors: Lloyd M. Robeson, Macungie; Robert J. Axelrod, Orefield; Jeffrey A. Kuphal, Blandon; Timothy L. Pickering, Emmaus, all of Pa.

[73] Assignee: Air Products and Chemicals, Inc., Allentown, Pa.

[21] Appl. No.: 682,168

[22] Filed: Apr. 5, 1991

[51] Int. Cl.$^5$ ............... D01D 5/26; D01F 13/04; D01G 1/04
[52] U.S. Cl. ........................... 264/28; 264/37; 264/85; 264/140; 264/143; 264/210.6; 264/210.8; 264/211; 264/211.16; 264/344; 264/DIG. 69
[58] Field of Search ............ 264/37, 211.16, 211.19, 264/28, 85, 140, 143, 210.6, 210.8, 211, 344, DIG. 69

[56] References Cited

U.S. PATENT DOCUMENTS

| | | | |
|---|---|---|---|
| 3,097,991 | 7/1963 | Miller et al. | 162/157 |
| 3,099,067 | 7/1963 | Merriam et al. | 28/82 |
| 3,382,305 | 5/1968 | Breen | 264/171 |
| 3,716,614 | 2/1973 | Okamato et al. | 264/171 |
| 3,855,056 | 12/1974 | Maeda et al. | 264/146 |
| 3,914,501 | 10/1975 | Miller et al. | 264/DIG. 75 |
| 4,278,623 | 7/1981 | Niegisch | 264/28 |

FOREIGN PATENT DOCUMENTS

| | | |
|---|---|---|
| 44-20869 | 9/1969 | Japan . |
| 4767754 | 3/1974 | Japan . |
| 63-5509 | 2/1988 | Japan ............... 264/211.16 |

OTHER PUBLICATIONS

"Additive Improves Properties of Scrap PP/PS Blends," D. R. Paul, et al., Modern Plastics, Dec. 1981, p. 60.

*Primary Examiner*—James Lowe
*Attorney, Agent, or Firm*—Robert J. Wolff; Mark L. Rodgers; James C. Simmons

[57] ABSTRACT

Ultra-fine polymeric fibers are produced from various polymeric materials by mixing with thermoplastic poly(vinyl alcohol) and extruding the mixture through a die followed by further orientation. The poly(vinyl alcohol) is extracted to yield liberated ultra-fine polymeric fibers. The polymer utilized can include post-consumer polymer waste.

15 Claims, No Drawings

PROCESS FOR THE PRODUCTION OF ULTRA-FINE POLYMERIC FIBERS

FIELD OF THE INVENTION

The present invention relates to the production of ultra-fine fibers from various polymeric materials including post-consumer polymer waste.

BACKGROUND OF THE INVENTION

The need to recycle polymeric materials, especially from the expanding post consumer waste stream, is increasing as demands increase and available landfill sites continue to decrease. Polymeric materials are a small, but growing fraction of the post consumer waste stream entering landfill sites. Polymeric materials can, of course, be recycled and various programs and investigations are underway to increase the amount of recycled polymers and find useful products where these materials can provide a needed and useful function. Polymeric constituents from the post consumer waste stream represent a new and unique source of materials for polymer-type applications. The recovery of polymers from this source yields many diverse type of products including a wide range of polymer mixtures from almost pure constituents (e.g. poly(ethylene terephthalate) from carbonated beverage containers and HDPE from milk bottles) to mixed classes (e.g. low density bottle scrap based on primarily polyolefins, high density bottle scrap containing primarily poly(ethylene terephthalate) and poly(vinyl chloride)), to mixtures of all bottle materials and finally mixtures of all polymer scrap including poly(vinylidene chloride), ethylene/vinyl alcohol copolymers, cellulosic products (e.g. cellophane), high acrylonitrile copolymers (such as Barex (Sohio:BP) based on acrylonitrile/methyl acrylate used for food packaging) and the like. Many of the polymers found in post consumer polymer scrap have solubility parameters greater than 10, for example one of the most common constituents, poly(ethylene terephthalate) has a solubility parameter of 10.6. The mechanical properties of commingled polymers of widely ranging compositions are quite poor and applications for commingled polymers generally fall in lowest range of cost/performance requirements for materials. These applications include flower pots, posts, lumber, fence slats, etc. In order to improve the properties of commingled polymer waste, Paul et.al. in Mod. Plast., 58, 60, (1981) noted that the styrene-ethylene/butylene-styrene ABA block copolymer commonly referred to as Kraton G yielded improved mechanical properties when admixed with polymer mixtures similar to that present in post consumer polymer waste.

Various processes for conversion of polymeric materials into fine fibers exist to meet the requirements of a myriad of applications. These processes include meltblowing processes to yield fibrous materials, melt spinning technology, and polymer blend processes followed by extraction of one of the components.

Miller and Merriam note in U.S. Pat. No. 3,097,991 that a polymer pulp can be made by extrusion of immiscible polymers followed by a paper beating type operation to separate the immiscible fibers. These fibers could then be dispersed in water and a polymer pulp could be made. The use of a solvent for one of the constituents of the immiscible polymer blend to liberate the fibers was noted in a similar patent by Merriam and Miller (U.S. Pat. No. 3,099,067). This patent discussed methods to make ultra-fine fibers of polyethylene, polychlorotrifluoroethylene, or polyamides. U.S. Pat. No. 3,382,305 discloses a process for the formation of oriented materials containing microfibers by blending at least two incompatible fiber-forming polymers via extrusion followed by drawing (orienting) and optionally dissolving one of the polymers from the resultant fibrous material. None of these references discuss or disclose the potential utility of polymer scrap or the utility of poly(vinyl alcohol) as a water soluble matrix for the production of fine fibers.

Japanese patent application Showa 47-67754 discloses a method for manufacturing fine fibrils containing poly(vinyl alcohol). They disclose a method involving mixing poly(vinyl alcohol) with 20-95% of one or more polymers with a solubility parameter of 10 (cal/cc)$^{\frac{1}{2}}$ or less and extruding and drawing the extruded mixture. The resultant drawn article is then beaten in water containing an inorganic salt to prevent the foaming and extraction of the poly(vinyl alcohol). They note that mixtures of polyethylene and polypropylene can be utilized in this process. They do not disclose the potential of using post-consumer polymer scrap nor the use of defoaming agents. Additionally, the disclosed process specifically does not remove the PVOH from the resultant fibers, in fact, the patent takes procedures to prevent removal of poly(vinyl alcohol).

Japanese Patent Application No. Showa 44-20869 discloses the method of manufacturing water-containing poly(vinyl alcohol) powder and a thermoplastic linear polymer powder by mixing them, followed by thermal fusion and extrusion. Molded articles were the subject of this invention and neither extraction of the poly(vinyl alcohol) nor fiber production from the extracted blend was carried out.

SUMMARY OF THE INVENTION

The present invention is a process for making ultra-fine polymeric fibers which are useful in a wide variety of end use applications. Such polymeric fibers are produced by mixing immiscible granular thermoplastic polymeric material with thermoplastic poly(vinyl alcohol) and extruding the resultant mixture through an extrusion die to partially orient the immiscible polymeric material into rods. The mixture is subsequently subjected to a further orientation step to orient the immiscible polymeric material into polymeric fibers. The thermoplastic poly(vinyl alcohol) is then extracted to produce ultra-fine polymeric fibers. Optionally, the extracted poly(vinyl alcohol) can be removed and recycled in this process.

The invention herein notes a process whereby a polymer blend approach is utilized employing a water soluble polymer which is biodegradable and immiscible with the vast majority of polymers for which ultra-fine fibers are desired. The water soluble polymer employed is thermoplastic poly(vinyl alcohol) which offers a property balance specifically desired for this process. The ultra-fine fibers from this process offer utility as fibrous thixotropes, oil spill containment, water sorption, composites with wood pulp based products, polymer paper, ultra-fine filters, insulation, as well as admixtures with woven fabrics to yield specific property modifications. Specific polymers (e.g. polypropylene, polyethylene, polystyrene etc.) and admixtures thereof are of interest for the ultra-fine fibers produced by the process noted in this invention. Additionally, post-consumer polymer waste is an important polymeric material to be utilized in this process.

Unlike the teachings of the prior art, the present process is capable of producing useful products in fibrous form from highly heterogeneous streams, i.e., post consumer scrap, and can even tolerate the presence of paper residue in the starting material without experiencing severe problems resulting from degradation of the paper during the extrusion process. By employing thermoplastic poly(vinyl alcohol) which is capable of being highly oriented even with large amounts of additional polymeric material and subsequently extracting the poly(vinyl alcohol) from the resultant fibers, useful ultra-fine fibers can be produced from polymeric material which otherwise would be discarded.

DETAILED DESCRIPTION OF THE INVENTION

The present invention is a process for producing ultra-fine fibers from a wide variety of polymeric materials. The process comprises mixing immiscible granular thermoplastic material with thermoplastic poly(vinyl alcohol) (PVOH) and extruding the resultant mixture through a die to partially orient the immiscible polymeric material into rod-like structures. The extrusion of the thermoplastic poly(vinyl alcohol) and the thermoplastic polymer can be conducted in conventional polymer extrusion equipment. The die design can be optimized to yield extensional flow to allow for orientation in the die. The mixture is then subjected to a further orientation step to form polymeric fibers. This further orientation step can be any technique which is capable of orienting polymeric material in solution to form fibers. Such methods include hot drawing and/or cold drawing techniques known to those skilled in the art. Following the orientation step, the poly(vinyl alcohol) is extracted, by any suitable method sufficient to remove substantially all of the PVOH such as by agitation in a water slurry, to produce ultra-fine polymeric fibers.

The present process is especially advantageous in that useful ultra-fine fibers can be formed from a wide variety of thermoplastic polymeric materials, including polymer scrap found in post consumer waste streams.

The thermoplastic polymeric materials can include polyolefins such as polypropylene, polyethylene (including high density polyethylene, low density polyethylene, linear low density polyethylene, linear very low density polyethylene, ethylene-propylene copolymers, ethylene-ethyl acrylate copolymers, ethylene-acrylic acid copolymers, ethylene-vinyl acetate copolymers, ethylene-methacrylic acid copolymers and ionomers), polystyrene, styrene copolymers (e.g. styrene-acrylonitrile copolymers), poly(methyl methacrylate), poly(vinyl acetate), polycarbonates, poly(butylene terephthalate), poly(ethylene terephthalate), nylon 6, nylon 11, nylon 12, nylon 6,6, as well as other polymers immiscible with poly(vinyl alcohol). Blends of these polymers are contemplated in this invention. Polymer scrap material, for which the present process is particularly advantageous, will typically include one or more of the following: poly(ethylene terephthalate), poly(vinyl chloride); polyolefins such as high density polyethylene (HDPE), low density polyethylene (LDPE), and polypropylene; high acrylonitrile copolymers; poly(vinylidene chloride); ethylene/vinyl alcohol copolymers; cellulosic products, polystyrene, ABS, and mixtures thereof, as well as any similar polymeric material. The ultra-fine fibers produced by this process can be processed into a wide variety of end products, thereby providing a useful alternative to the disposal of such scrap material.

The poly(vinyl alcohol) utilized in this process is prepared from the hydrolysis of poly(vinyl acetate). The preparation of poly(vinyl acetate) and hydrolysis to poly(vinyl alcohol) is well known to those skilled in the art and are discussed in detail in the books "Poly(vinyl alcohol): Properties and Applications," ed. by C. A. Finch, John Hiley & Sons, New York, 1973 and "Poly(vinyl alcohol) Fibers," ed. by I. Sakurada, Marcel Dekker, Inc., New York, 1985. A recent review of poly(vinyl alcohol) was given by F. L. Marten in the Encyclopedia of Polymer Science and Engineering, 2nd ed., Vol. 17. p. 167, John Hiley & Sons, New York, 1989. As noted in this reference, several patents claim the preparation of extrudable poly(vinyl alcohol) utilizing high boiling water-soluble organic compounds containing hydroxyl groups. These compounds (e.g. glycerol, low molecular weight poly(ethylene glycols)) are plasticizers which lower the melting point of poly(vinyl alcohol) into a processible range. Other suitable plasticizers such as sulfonamides can be considered if they are high boiling and miscible with poly(vinyl alcohol).

Prior to being mixed with the thermoplastic PVOH, the thermoplastic polymeric material, if not already in granular form, is ground, typically by mechanical or cryogenic grinding techniques, to form granular flakes. The polymeric granules are mixed to form a blend with PVOH which serves as an extractable matrix for the production of the fibers. The use of PVOH in this process is critical in that it is water soluble, is immiscible with the primary components of the polymer waste, is capable of being highly oriented even in the presence of large amounts of added polymer scrap and is biodegradable. All of the above attributes are necessary for the successful operation of the present process. Additionally, the PVOH used in this process is required to be thermoplastic in the range of 170°–230° C. To achieve this required thermoplastic behavior (i.e. reduction of the melting point to a processable range), plasticizers which are high boiling, water-soluble organic compounds containing hydroxyl groups, such as glycerol, low molecular weight poly(ethylene glycols) and the like are added to the PVOH. The preferred range of hydrolysis of the PVOH for utility in this invention is between about 72–99%, and preferably from 78–94%. Other water soluble polymers can also be added such as poly(vinyl pyrrolidone), poly(ethyl oxazoline) and poly(ethylene oxide).

Optionally, a defoaming agent, can be added to the PVOH/polymeric mixture to reduce or prevent foaming during extraction process as noted in U.S. Pat. Nos. 4,844,709 and 4,845,140. Preferred are ethylene oxide/propylene oxide block copolymer surfactants with surface tensions between 40 to 48 dynes/cm as a 0.1 aqueous solution at 25° C.

The initial extrusion through the die results in partial orientation of the polymeric material into short strands or rods. In order to form long, continuous ultra-fine fibers the mixture is subjected to a further orientation step. This orientation step is carried out by hot drawing and/or cold drawing procedures known in the art. The orientation step results in ultra-fine polymeric fibers in PVOH.

The extrusion of the thermoplastic poly(vinyl alcohol) and various polymers into cylindrical structures through a circular die is a preferred embodiment of this invention. Other preferred geometries include slot dies and film dies to yield tapes and films which are also oriented via hot drawing or cold drawing procedures. Other geometries, (e.g. ellipsoidal) can also be contemplated in this invention. The resultant oriented structures can be chopped into convenient lengths. The resultant pellets, chopped tapes or films can be added to water and optionally allowed to soak in water (cold or hot) and then added to a device to provide shear to separate the fine fibers from the poly(vinyl alcohol). This equipment can include various blenders equipped with agitation devices including those commonly utilized in the pulp and paper industry to beat wood particles into pulp. The foaming which results can be controlled by the addition of an antifoam for poly(vinyl alcohol) known in the art and also described in U.S. Pat. Nos. 4,844,709 and 4,845,140. The addition of antifoam is however not necessary if closed vessels are employed for the agitation of the poly(vinyl alcohol) fine fiber composite. Indeed, the foaming may yield improved liberation of the fibers. The resultant agitated blend consisting of liberated fibers and extracted poly(vinyl alcohol) dissolved in the water phase can be separated via filtration using porous mesh screens or other appropriate filtration media. The extraction process can be repeated (with optionally further agitation) to remove poly(vinyl alcohol). This process can be repeated several times depending on the level of poly(vinyl alcohol) removal desired. The extracted poly(vinyl alcohol) can be recovered, dried and recycled in this process. Counter current extraction processes utilizing water fed to the last extraction stage and recovered and utilized in the other stages. The most concentrated poly(vinyl alcohol) extract will come from the first stage which can then be recovered for reuse in this process or recovered for utilization in other poly(vinyl alcohol) applications. The resultant extracted fibers can be dried and utilized in the various applications noted in this disclosure as well as any other applications for which the ultra-fine fibers of this invention may be suitable. We have found, unexpectedly, that by vigorously extracting the PVOH from the polymeric fibers, the resultant fibers are suitable for a wide variety of end-use applications such as asbestos replacements, use in fibrous thixotropes, reinforcement additives for cement, caulks, mastics, adhesives, coatings and the like. The use of thermoplastic PVOH to orient the fibers and, unlike the prior art, subsequently extracting the PVOH from the formed fibers, allows the present process to produce useful fibers from various polymers including heterogeneous scrap material, even in the presence of non-thermoplastic contaminants, such as paper residue.

Another advantage of using thermoplastic PVOH is, as stated above, that it is biodegradeable and therefore does not present a serious environmental problem relating to disposal in a waste stream. Notwithstanding this fact, we have found that the extracted PVOH can be recycled and reused in the original mixing step with additional scrap material, thus reducing cost and waste and increasing process efficiency.

The following examples are presented to better illustrate the present invention and are not meant to be limiting.

EXAMPLE 1

A blend of pellets/powder of the following composition was prepared

50% Vinex ™ 2025 PVOH (a thermoplastic PVOH manufactured by Air Products and Chemicals, Inc.)
10% Polystyrene Aldrich Chem Co. $M_W=250,000$
10% Polypropylene Profax 6523 (Himont)
20% HDPE
10% LLDPE The HDPE was from Exxon (Melt Flow=2.3 dg/min (190°0 C., 44 psi)) and the LLDPE was from Exxon (Melt Flow=6.9 dg/min (190°, 44 psi))

The dry blended pellets/powder were fed to a 1" diameter Killion extruder (L/D=30) and extruded at 390° F. The resultant extruded product was drawn and cooled by contacting with dry ice and followed by chopping into N⅛" pellets. The pellets were immersed in water and rapidly agitated using a Waring blender. The product was separated from the water and the fibrous mass was squeezed to remove excess water and dissolved PVOH. This procedure was repeated several times to remove residual PVOH. Scanning electron microscopy revealed fiber diameters in the range of $1\mu$. This mixture was utilized to simulate polymer scrap similar to compositions which could be present from post-consumer waste streams.

EXAMPLE 2

A sample of NJCT was obtained for evaluation in this process. NJCT (New Jersey Curbside Tailings) is an actual polymer waste stream comprised of polymer container scrap after the HDPE milk bottles and the PET (poly(ethylene terephthalate)) carbonated beverage bottles have been removed. This product consists primarily of HDPE with some polypropylene, poly(vinyl chloride) and poly(ethylene terephthalate). A further description of this product is given in Plastics Engineering, p. 33, Feb. 1990. The polymer flakes are somewhat contaminated with paper as well as with residual bottles contents (e.g. detergent, etc.). This product was added to water and the flakes which floated were removed and dried. A mixture of 50% Vinex 2025 and 50% (by weight) of the NJCT flakes (which floated on water) was extruded at 390° C. in the Killion extruder noted in Example 1. The resultant extrudate was drawn and cooled over dry ice. The pelletized product was immersed in water and agitated in a Waring blender to extract the poly(vinyl alcohol) and liberate the fine fibers generated via this process. The resultant extracted product consisted of fine fibers as observed visually and by scanning electron microscopy.

EXAMPLE 3

The polymer NJCT flakes as received were washed, dried and ground to fine particles via liquid nitrogen grinding. A blend of 50% Vinex 2025 PVOH and 50% NJCT powder was extruded as per example 2. The resultant drawn, pelletized blend was agitated in a water slurry in a Waring blender to remove the poly(vinyl alcohol) and free the fibrous structure of the NJCT component. The resultant extracted product was comprised of fine fibers. The PET powder from this process did not fibrillate but did not interfere with the rest of the product.

EXAMPLE 4

A simulated polymer scrap mixture comprised of a large number of polymeric materials was blended with thermoplastic poly(vinyl alcohol) in the following proportions.

50% Vinex 2025 PVOH
10% Polystyrene (see example 1)
5% Polypropylene Profax 6523 (Himont)
5% LLDPE (see example 1)
5% HDPE (see example 1)
5% PMMA (Plexiglas DR-100) (Rohm & Haas)
1% Noryl SE-100 (General Electric)
1.5% Poly(vinyl acetate)
4% Ethylene/acrylic acid copolymer EAA-1410 (Dow Chemical Co.) 10% LDPE (Norchem)
3.5% PVC-1185 (+3% TM-181) (Air Products and Chemicals, Inc.)

there was little tendency for the less dense synthetic pulp material to segregate or float. After pressing and drying, the synthetic pulp was visually apparent in the sheets but appeared to be uniformly dispersed throughout.

Representative samples from each set of handsheets were given an additional heat and pressure treatment to bond the plastic fibers together. Treatment conditions were 2 minutes at 120° C. and 3000 psi pressure using a Carver press. The handsheets were tested for wet and dry tensile strength following TAPPI Method 494. The results are shown in Table 1.

TABLE 1

KRAFT/SYNTHETIC PULP HANDSHEETS
Physical Properties Data

| Test | Control | 10% | 20% | 30% | Heat Treated Samples | | | |
|---|---|---|---|---|---|---|---|---|
| | | | | | Control | 10% | 20% | 30% |
| Grammage g/m$^2$ | 144.1 | 148.0 | 147.1 | 137.4 | 144.1 | 148.0 | 147.1 | 137.4 |
| Basis Weight lb/1000 ft$^2$ | 29.5 | 30.3 | 30.1 | 28.1 | 29.5 | 30.3 | 30.1 | 28.1 |
| Dry T.S., lb/in | 23.0 | 17.2 | 14.1 | 9.0 | 20.2 | 21.0 | 23.5 | 20.7 |
| kN/m | 4.0 | 3.0 | 2.5 | 1.6 | 3.5 | 3.7 | 4.1 | 3.6 |
| Wet T.S., lb/in | 0.9 | 0.9 | 0.8 | 0.7 | 0.9 | 1.7 | 2.9 | 4.3 |
| kN/m | 0.2 | 0.2 | 0.1 | 0.1 | 0.2 | 0.3 | 0.5 | 0.8 |
| Tens. Index, Nm/g | 27.9 | 20.3 | 16.8 | 11.5 | 24.5 | 24.8 | 28 | 26.4 |
| Wet TI, Nm/g | 1.1 | 1.1 | 1.0 | 0.8 | 1.1 | 2.0 | 3.5 | 5.5 |
| Wet/Dry, % | 3.9% | 5.2% | 5.7% | 7.3% | 4.5% | 8.1% | 12.3% | 20.8 |
| Breaking Length, meters | 2794 | 2035 | 1678 | 1147 | 2455 | 2485 | 2797 | 2638 |

The resultant blend was extruded as per example 2, drawn, and pelletized. The fibrous product was liberated from the thermoplastic poly(vinyl alcohol) matrix via agitation in a Waring blender. The resultant extracted product consisted of fine fibers as noted in the prior examples.

EXAMPLE 5

A sample of the extruded, oriented pellets of example 1 was dispersed in a quart of water and allowed to set for 4 hours. The sample was further diluted and agitated in a pulp disintegrator. Antifoam was added to lower foaming. After several extractions, several hand sheets were prepared in a laboratory hand sheet apparatus. Also wood pulp was blended with the polymer fibers in the pulp disintegrator followed by handsheet preparation. A uniform mixture of the wood and polymer fibers was obtained. This experiment demonstrates the ability to use the product of this invention in paper making equipment, and to mix the product of this invention with wood pulp.

EXAMPLE 6

Paper Handsheets with Synthetic Pulp Added

A synthetic pulp prepared from the simulated polymer waste product of Example 1 was used in conjunction with a long fibered unbleached Kraft pulp to prepare composite paper handsheets. Handsheets containing 10, 20, and 30 weight percent synthetic pulp were prepared as follows.

Twenty-four grams of the synthetic pulp/Kraft pulp mixture were soaked in 2 liters of water for 3 hours. The slurry was then disintegrated for 17 minutes in a British Standard Pulp Disintegrator operating at 3000 rpm. The slurry was dluted to 7.2 liters and 400 ml portions were taken for handsheet formation. The handsheets were prepared on a British Standard Handsheet Former following TAPPI Method 205. The synthetic pulp formed an intimate mixture with the Kraft pulp and The as-prepared handsheets suffered a loss in density and dry strength as a result of synthetic fiber addition. This is attributed to interference with wood to wood fiber bonding by the hydrophobic polymer fibers. The tensile strength was reduced in proportion to the amount of synthetic fiber used. In contrast, the thermally treated samples showed no loss in dry tensile strength compared to the control, and the wet tensile strength was increased by as much as 460%. This is attributed to thermoplastic bonding of the synthetic fibers with each other and perhaps with wood fibers as well. Thus the thermally treated composite handsheets display a superior balance of properties compared to Kraft handsheets containing no synthetic pulp.

EXAMPLE 7

Preparation of Synthetic Pul Felt Mats

Twenty-four grams of synthetic pulp from Example 1 was soaked in two liters of tap water for three hours. Although composed of hydrophobic plastic fibers, the pulp readily absorbed water. The slurry was mixed for five minutes in the pulp disintegrator to thoroughly disperse the fibers in water. However, on standing the fibers soon floated to the surface because of their low density.

Samples were dipped from the slurry and formed into mats using the British Standard handsheet former following TAPPI Method 205. Because there are no inter-fiber bonding forces as is the case with wood fibers, the synthetic pulp mats had very little strength and were difficult to remove from the draining wire without breaking into pieces. Similarly, the dried mats were of low density and strength; however, with suitable care they could be handled without damage.

The fiber mats are useful as absorbent pads, e.g. as clean-up aids for oil spills, aqueous chemicals, etc.

EXAMPLE 8

A mixture of 55% Vinex 2025 PVOH and 45% Profax ™ 6523 polypropylene was extruded in a 1" Killion single screw extruder (L/D=24/1) at 200° C. The extruder RPM was 36, the product rate was 5.3 lbs/hour and the strand rate (2 strands) was 17 ft/minute after drawing. The sample was hot drawn and cooled on steel rollers prior to pelletizing. The pellets were immersed in warm water for several minutes followed by agitation in a laboratory blender. The sample was filtered using cheesecloth and resoaked in water followed by agitation. This process was repeated four times to remove the residual PVOH. The fine fibers were then dried. The photomicrographs taken with a SEM (scanning electron microscope) indicated fiber diameters in the range of 1 to 10μ.

EXAMPLE 9

A mixture of 50% Vinex 2025 PVOH, 40% Profax 6823 polypropylene, and 10% Surlyn ™ 8660 ethylene/methacrylic acid copolymer ionomer available from duPont was extruded in a 1" Killion extruder at 180°-200° C. at an RPM of 8 and a rate of 800 grams/hour. The extruded strand was hot drawn and chopped into pellets. The pellets were immersed in water, agitated, and then filtered. The agitation and filtration process was repeated several times to remove residual PVOH.

EXAMPLE 10

A mixture of 50% Vinex 2034 PVOH, a thermoplastic PVOH available from Air Products and Chemicals, Inc. and 50% NJCT (New Jersey Curbside Tailings: as described in Plastics Engineering, p. 33, Feb. 1990) was extruded in a 1" Killion extruder at 180°-200° C. The NJCT was ground in liquid N2 to 50 mesh size prior to extrusion. The extruded sample was hot drawn and pelletized. The pellets were immersed in water and agitated in a laboratory blender. The product was filtered and the agitation/filtration process was repeated several times to remove the residual PVOH.

EXAMPLE 11

A mixture of 50% Vinex 2025 PVOH, 30% polypropylene (Profax 6823), and 20% ethylene-methacrylic acid ionomer (Surlyn 8660) was extruded in a 1" Killion extruder at 180°-200° C., RPM=9, rate=732 grams/hour. The extruded strand was hot drawn, cooled and pelletized. The pellets were immersed in water and agitated in a laboratory blender. The product was then filtered. The agitation/filtration procedure was repeated several times to remove residual PVOH.

EXAMPLE 12

The procedure of example 9 was repeated except an additional 10 minutes agitation time was conducted before the final filtration.

EXAMPLE 13

A mixture of 50% Vinex 2025 PVOH and 50% Profax 6523 polypropylene was extruded in a 1" Killion extruder at 180°-200° C., RPM=9.1, rate=672 grams/hours. The extruded strand was hot drawn, cooled and pelletized. The pellets were immersed in water and agitated in a laboratory blender. The product was then filtered. The agitation/filtration procedure was repeated several times to remove residual PVOH.

EXAMPLE 14

A mixture of 40% thermoplastic poly(vinyl alcohol) and 60% polypropylene (Profax 6523) was extruded in a 1" Killion extruder, RPM=10.3, rate=568 grams/hour. The extruded strand was hot drawn, cooled and pelletized. The pellets were immersed in water and agitated in a laboratory blender. The product was filtered and the agitation/filtraton procedure was repeated several times to remove residual PVOH.

EXAMPLE 15

The procedure of example 9 was repeated except that the agitation time prior to final filtration was an additional 40 minutes.

EXAMPLE 16

The procedure of example 10 was repeated except the granulated NJCT utilized was immersed in water and the floating particles were removed and dried. This removed the PET and PVC particles. The granulated product was used as is without liquid N2 grinding.

EXAMPLE 17

A mixture of 60% Vinex 2025 PVOH and 40% Profax 6523 polypropylene was extruded in a 1" Killion extruder at 180°-200° C., RPM=8.8, rate=684 grams/hour. The extruded strand was hot drawn, cooled and pelletized. The pellets were immersed in water, agitated in a Waring blender and filtered. The agitation/filtration process was repeated several times to remove residual PVOH.

EXAMPLE 18

A mixture of 70% Vinex 2025 PVOH and 30% Profax 6523 polypropylene was extruded in a 1" Killion extruder at 180°-200° C., RPM=9.5, rate=648 grams/hour. The extruded strand was hot drawn, cooled and pelletized. The pellets were immersed in water, agitated in a Waring blender and filtered. The agitation filtration process was repeated several times to remove residual PVOH.

EXAMPLE 19

A rheological test protocol was established to determine the effectiveness of various ultrafine fibers as rheology modifiers for adhesives, caulks, etc. A commercial DGEBA-type epoxy resin (Dow Chemical's DER 331) was chosen as the base material for all of the evaluations. The complex viscosity of the various fiber-epoxy resin mixtures (as a function of shear rate) was used to differentiate among materials. In addition to APCI-developed fibers, two commercial materials were examined as rheology modifiers (DuPont's PE PULP TA-12 and Hercules' PULPEX EDH). Many of the fibers of this invention exhibited superior viscosity improvement (at fiber equivalent loadings) compared to the commercial samples. The procedures described below were used to prepare the fiber-epoxy mixtures and obtain the rheological data.

Test Procedures

Each fiber was washed with distilled water to remove any residual poly(vinyl alcohol) and dried at room temperature under vacuum overnight. The fibers were then mixed with Dow Chemical's DER 331 epoxy resin at fiber weight loadings of 1.0 and 2.5%. After vigorous mixing (by hand) with a metal spatula at room temperature, the fiber-epoxy resin mixture was degassed by placing it in an oven at 50°-70° C. and holding it under vacuum overnight. Upon removal from the oven, some of the mixtures displayed nonuniformity, i.e. the fibers separated from the epoxy. Each of the mixtures were gently re-mixed to assure sample uniformity and allowed to cool to room temperature. The mixtures were stored under vacuum until they were ready to be tested.

The complex viscosity-shear rate data were obtained at 27° C. on a Rheometrics RMS-605 Mechanical Spectrometer using a cone and plate fixture (cone angle: 0.106 radian; plate=25.4 mm diameter; gap: 0.050 mm). A shear rate range of 0.0628-99.54 rad/sec was employed Dynamic (as opposed to steady) testing (using a strain of 100%) was utilized for all samples. The dynamic mode of testing reduced the possibility of fiber orientation during the test measurement. A sample of neat DER 331 was also evaluated for comparison purposes. Rheological data were collected at five frequencies for each decade of frequency. All of the measurements were made in a nitrogen atmosphere.

A small amount of each ultrafine fiber-epoxy mixture was placed on the plate and the cone was lowered until a gap of 0.08-0.11 mm was reached. The bulk of the excess mixture was removed with a metal spatula. The sample was allowed to reach 27° C. after which the gap was set to 0.050 mm. Any additional excess of the mixture was removed so that a straight edge formed between the outside edge of the plate, the sample, and the outside edge of the cone. The samples were allowed to thermally re-equilibrate to 27° C. prior to testing. Care was taken during sample loading to ensure that no normal force existed between the cone and the plate (due to the presence of fibers on the order of 0.05 mm located under the central part of the cone).

EXAMPLE 20

Using the test procedure described above, the following fiber samples were evaluated as rheology modifiers: DuPont's PE PULP TA-12, Hercules' PULPEX EDH and Example 13 fibers. Fiber loadings of 1.0 and 2.5 weight percent in DER 331 epoxy resin were examined.

Table 2 summarizes the (averaged) complex viscosity-shear rate data for each of these fiber-modified epoxy samples (at the 1.0 wt % loading) and the control DER 331 sample. The data reported in Table 2 are the average of two or three runs for each composition. For each duplicate run the samples were reloaded into the rheometer to eliminate the possibility of sample orientation (as a result of the first dynamic rate sweep).

The data in Table 2 indicate the marked increase in viscosity with the addition of ultrafine fibers. Except for the DER 331 sample, which exhibited Newtonian behavior (shear rate independent viscosity), each of the samples displayed shear thinning, i.e. decreasing viscosity with increasing shear rate. The viscosity of the fiber-modified epoxies began to approach the viscosity of the neat DER 331 at the higher shear rates.

The fluctuations in viscosity for DER 331 (at the low shear rates) are evidence that the complex viscosity data at the lower shear rates are subject to greater error. This is due to the fact that the observed torques at these low shear rates were at the lower limit of the transducer.

Most notable in Table 2 is the fact that Example 13 fibers provided higher viscosities over the entire shear rate range than either of the commercial samples. These data imply that lower fiber loadings of Example 13 can be used to obtain equivalent performance to the duPont and Hercules materials.

TABLE 2

Summary of Complex Viscosity-Shear Rate Data (at 27° C.) for DER 331, PE PULP TA-12, PULPEX EDH, and Example 13 fibers

| Shear Rate [Rad./Sec] | Complex Viscosity | | | |
|---|---|---|---|---|
| | DER 331 [Poise] | PE PULP TA-12* [Poise] | PULPEX EDH* [Poise] | Example 13 fibers [Poise] |
| 0.06280 | 220 | 1410 | 980 | 2300 |
| 0.09953 | 100 | 1030 | 730 | 1610 |
| 0.1578 | 110 | 820 | 560 | 1220 |
| 0.2500 | 130 | 685 | 480 | 960 |
| 0.3963 | 110 | 560 | 425 | 745 |
| 0.6280 | 125 | 495 | 380 | 610 |
| 0.9954 | 120 | 430 | 340 | 505 |
| 1.578 | 125 | 380 | 300 | 435 |
| 2.500 | 120 | 340 | 280 | 385 |
| 3.963 | 120 | 310 | 260 | 350 |
| 6.281 | 120 | 280 | 245 | 315 |
| 9.954 | 120 | 260 | 230 | 290 |
| 15.78 | 120 | 240 | 215 | 270 |
| 25.00 | 120 | 220 | 200 | 250 |
| 39.63 | 120 | 210 | 190 | 235 |
| 62.81 | 120 | 195 | 185 | 220 |
| 99.54 | 120 | 185 | 175 | 205 |

*1.0 weight % fiber loading

The (averaged) complex viscosity-shear rate data (at 27° C.) for these fiber-modified epoxies (at the 2.5 weight % loading) and the control DER 331 sample are presented in Table 3. The trends in the data are equivalent to those observed at the 1.0 weight % fiber loadings.

The data in Table 3 summarized the complex viscosity-shear rate data at the 2.5 wt % fiber loading.

TABLE 3

Summary of Complex Viscosity-Shear Rate Data (at 27° C.) for DER 331, PE PULP TA-12, PULPEX EDH, and Example 13 fibers

| Shear Rate [Rad./Sec] | Complex Viscosity | | | |
|---|---|---|---|---|
| | DER 331 [Poise] | PE PULP TA-12* [Poise] | PULPEX EDH* [Poise] | Example 13 fibers [Poise] |
| 0.06280 | 220 | 5780 | 3610 | 11000 |
| 0.09953 | 100 | 4030 | 2880 | 7510 |
| 0.1578 | 110 | 3200 | 2320 | 5300 |
| 0.2500 | 130 | 2420 | 1790 | 3820 |
| 0.3963 | 110 | 1870 | 1420 | 2780 |
| 0.6280 | 125 | 1460 | 1150 | 2030 |
| 0.9954 | 120 | 1170 | 925 | 1510 |
| 1.578 | 125 | 935 | 755 | 1120 |
| 2.500 | 120 | 760 | 625 | 880 |
| 3.963 | 120 | 640 | 530 | 715 |
| 6.281 | 120 | 555 | 465 | 600 |
| 9.954 | 120 | 490 | 415 | 515 |
| 15.78 | 120 | 435 | 375 | 450 |
| 25.00 | 120 | 390 | 340 | 405 |
| 39.63 | 120 | 350 | 305 | 365 |
| 62.81 | 120 | 315 | 280 | 330 |
| 99.54 | 120 | 290 | 260 | 300 |

*2.5 weight % fiber loading

EXAMPLE 21

Table 4 summarizes the (averaged) complex viscosity-shear rate data for each of the noted fiber samples. The data reported in Table 4 are the average of two or three runs for each composition. For each duplicate run the samples were reloaded into the rheometer to eliminate the possibility of sample orientation as a result of the first dynamic rate sweep.

TABLE 4

| Sample Description | Complex Viscosity in Poise (27° C.) Rate (RAD/SEC) | | | |
|---|---|---|---|---|
| | 0.0628 | 0.2500 | 2.500 | 25.00 |
| 1% Example 8 | 1380 | 620 | 315 | 215 |
| 2.5% Example 8 | 6250 | 2320 | 665 | 355 |
| 1% Example 9 | 1950 | 785 | 350 | 225 |
| 2.5% Example 9 | 9100 | 3420 | 935 | 445 |
| 1% Example 10 | 1560 | 720 | 355 | 230 |
| 2.5% Example 10 | 6800 | 2710 | 840 | 420 |
| 1% Example 11 | 1720 | 710 | 320 | 210 |
| 2.5% Example 11 | 6760 | 2530 | 725 | 355 |
| 1% Example 12 | 1950 | 790 | 355 | 225 |
| 2.5% Example 12 | 11,100 | 4060 | 960 | 425 |
| 1% Example 14 | 960 | 435 | 250 | 190 |
| 2.5% Example 14 | 6080 | 1900 | 580 | 335 |
| 1% Example 15 | 1900 | 900 | 380 | 240 |
| 2.5% Example 15 | 10,000 | 3710 | 935 | 430 |
| 1% Example 16 | 805 | 530 | 280 | 210 |
| 2.5% Example 16 | 3250 | 1750 | 590 | 360 |
| 1% Example 17 | 1890 | 775 | 340 | 230 |
| 2.5% Example 17 | 11,400 | 4510 | 1010 | 450 |
| 1% Example 18 | 2070 | 825 | 355 | 230 |
| 2.5% Example 18 | 11,800 | 4680 | 1080 | 460 |

EXAMPLE 22

The fibers of example 8 were immersed in water and mixed in a pulp disintegrator. The resultant slurry was formed into mats using the British Standard handsheet former following TAPPI Method 205. The synthetic pulp mats were then removed and dried.

EXAMPLE 23

The mats of example 8 after drying were subjected to oil sorption tests. The oil sorption test consisted of a preweighed fiber mat being immersed in a pan of Sunoco Ultra 10W30 motor oil and allowing the mat to soak for various time intervals. The sheet was then transferred to a dry pan and weighed. For the ultra-fine fiber sample of example 8 sheets of various weights were prepared as per the procedure of example 22. The oil sorption results are given in Table 5.

TABLE 5

| Weight of Fiber Mat (grams) | Oil Sorption (%) | | | |
|---|---|---|---|---|
| | 10 min. | 20 min. | 30 min. | 40 min. |
| 1.8909 | 1,906% | 1,968% | — | — |
| 3.7266 | 346% | 1,945% | 1,956% | |
| 6.7659 | 1,245% | 1,406% | 1,504% | 1,507% |

EXAMPLE 24

A sample of NJCT (New Jersey Curbside Tailings) was obtained (Plastics Engineering, p. 33, Feb. 1990). The sample was washed, extruded and cryoground. A blend of 45% Vinex 2034 PVOH, 45% cryoground NJCT and 10% Surlyn 9020 ethylene-methacrylic acid ionomer available from duPont was extruded at 180°-190° C. hot drawn, cooled and pelletized. The pellets were water extracted as per the procedure noted in example 8. The dried fine fibers of this example were formed into mats using the procedure of example 26. The oil sorption results on these mats as per the sorption procedure noted in Example 23 are listed in Table 6.

TABLE 6

| Weight of Fiber Mat (grams) | Oil Sorption (%) | | |
|---|---|---|---|
| | 10 min. | 20 min. | 30 min. |
| 1.9397 | 895% | 895% | — |
| 4.2119 | 585% | 638% | 713% |

TABLE 6-continued

| Weight of Fiber Mat (grams) | Oil Sorption (%) | | |
|---|---|---|---|
| | 10 min. | 20 min. | 30 min. |
| 5.8040 | 486% | 495% | 534% |

EXAMPLE 25

A sample of NJCT (as described in example 24) was washed in water and the granules which floated were separated and dried. This sample was blended with Vinex 2025 PVOH 50/50 by wt., extruded in a 1" single screw Killion extruder (L/D=30/1), hot drawn, cooled over dry ice, and pelletized. The pellets were extracted of the poly(vinyl alcohol) as per the procedure of example B and ultra-fine fibers resulted. The fibers were formed into mats as per the procedure in example 22. Nominally, 2, 4 and 6 gr. mats were prepared for oil sorption studies as per example 23. The oil sorption results are given in Table 7.

EXAMPLE 26

A blend of 50% Vinex 2025 PVOH/40% Profax 6823 polypropylene/10% Surlyn 8660 ethylene-methacrylic acid ionomer was extruded using a 1" Killion extruder equipped with mixing sections (L/D=30/1) at 180°-190° C. The extruded strand was hot drawn (10/1 draw ratio) cooled and pelletized. The extruder RPM was 8.0 and the product rate was 800 grams/hr. The resultant product was extracted with water to remove the poly(vinyl alcohol) and liberate the fibers as per the procedure in example 8. The fibers were formed into mats as per the procedure in example 22. Nominally, 2, 4, and 6 gr. mats were prepared for oil sorption studies as per example 23. The oil sorption results are given in Table. 7.

EXAMPLE 27 (CONTROL EXAMPLE)

A fine fiber sample of Pulpex EDH was obtained from Hercules for evaluation. Pulpex EDH is a polyethylene fine fiber produced specifically for sprayed ceiling texture compounds. The properties are: density=0.96 g/cc., melting point=132° C., fiber length 0.6-1.2 mm, fiber diameter=30-40μ. Pulpex EDH was agitated into a pulp-like consistency and mats were prepared as per the procedure noted in example 22 and tested for oil sorption as per the procedure in example 23. The oil sorption results on nominal 2 gr, 4 gr and 6 gr sheets are listed in Table 7.

TABLE 7

| | Comparison of Oil Sorption Results | | |
|---|---|---|---|
| Sample Designation | Oil Sorption (weight % increase) (>20 minutes immersion) | | |
| | 2 gr. | 4 gr. | 6 gr. |
| Control Example (27) | 998% | 811% | 743% |
| Exmaple 25 | 1,293% | 1,014% | 900% |
| Example 26 | 1,076% | 751% | 675% |

EXAMPLE 28

A blend of 50% Vinex 2025 PVOH and 50% (by weight) of Profax 6723 polypropylene obtained from Himont was extruded in a 1" Killion extruder (30/1 L/D) at 200° C. The extruded strand was oriented, cooled and chopped into ⅛"-3/16" pellets. The extruder RPM was 8.5, the extrusion rate was 730 grams/hour, the extruded strand take-up rate was ~65 ft./min. The pellets were soaked in water and agitated in a laboratory blender for 30 seconds to one minute. The sample was filtered to remove the water soluble components. The water soluble fraction (Vinex 2025 PVOH) was devolatilized in an air circulating oven at 80°-90° C. for several days. After drying, 70% of the Vinex 2025 PVOH was recovered. The extracted pellets were reextracted with water and agitated several times (using a laboratory blender) and then dried. The resultant dried product was a fluffy fibrous mass of fine polypropylene fibers.

The second stage of this experiment involved the testing and recycle of the extracted Vinex 2025 PVOH. The melt flow of the original Vinex 2025 PVOH is compared with the extruded, extracted and dried Vinex 2025 PVOH below:

| | Melt Flow (200° C., 44 psi) | |
|---|---|---|
| Sample Description | MF$_{10}$ dg/min. | MF$_{30}$ dg/min. |
| Vinex 2025 PVOH | 5.0 | 5.2 |
| Extruded and Extracted Recovered Vinex 2025 PVOH | 5.1 | 4.7 |

The recovered Vinex 2025 PVOH had virtually identical melt flow (thus melt viscosity) as the control Vinex 2025 PVOH.

The recovered Vinex 2025 PVOH and control Vinex 2025 PVOH 50/50 blend was extruded with Profax 6723 polypropylene in a 1" Killion extruder. (Composition by wt.=25% recovered Vinex 2025 PVOH/25% control Vinex 2025 PVOH/50% Profax 6723 polypropylene). The extruded strand was oriented, cooled and chopped into ⅛"-3/16" pellets. The extruder RPM was 15.3, the rate was 918 grams/hour and the take-up rate was 50 ft/min. The pellets were extracted of poly(vinyl alcohol) by agitation in a laboratory blender followed by filtration. This procedure was repeated several times.

Another comparison was made by extruding a blend of 50% of the recovered Vinex 2025 PVOH and 50% Profax 6723 polypropylene in a 1" Killion extruder 30/1 L/D at 200° C. The extruded strand was oriented, cooled and chopped into ⅛"-3/16" pellets. The extruder RPM was 21.3, the product rate was 870 grams/hour and the take-up rate was 50 ft/min. The pellets were extracted of poly(vinyl alcohol) by agitation in a laboratory blender followed by filtration. This procedure was repeated several times to remove substantially all of the PVOH.

The three samples of fine polypropylene fibers were tested for fibrous thixotropy using DER-331 epoxy resin as the liquid phase. Comparisons with the control resin DER-331, and 1 and 2.5 wt. % addition to DER-331 as well as a melt blown fiber utilized for fibrous thixotropy applications (Pulpex EDH). The data are listed in Table 8.

TABLE 8

| Shear Rate | Viscosity (Poise) | | | | | 50/50 Recycle/ Control 1% | 50/50 Recycle/ Control 2.5% | 100% Recycle 1.0% | 100% Recycle 2.5% |
|---|---|---|---|---|---|---|---|---|---|
| | DER-331 | 1% Pulpex EDH | 2.5% Pulpex EDH | Control Sample 1% | Control Sample 2.5% | | | | |
| 0.0628 | 220 | 980 | 3610 | 1140 | 6130 | 1290 | 5930 | 595 | 4660 |
| 0.0995 | 100 | 730 | 2880 | 795 | 4350 | 955 | 4170 | 440 | 2590 |
| 0.158 | 110 | 560 | 2320 | 650 | 3200 | 770 | 3050 | 370 | 1620 |
| 0.25 | 130 | 480 | 1790 | 530 | 2430 | 620 | 2320 | 300 | 1140 |
| 0.40 | 110 | 425 | 1420 | 440 | 1840 | 505 | 1780 | 255 | 870 |
| 0.63 | 125 | 380 | 1150 | 375 | 1410 | 430 | 1370 | 235 | 695 |
| 0.995 | 120 | 340 | 925 | 325 | 1080 | 365 | 1060 | 210 | 560 |
| 1.578 | 120 | 300 | 755 | 305 | 830 | 320 | 825 | 200 | 455 |
| 2.5 | 120 | 280 | 625 | 260 | 650 | 275 | 655 | 180 | 375 |
| 3.96 | 120 | 260 | 530 | 235 | 545 | 255 | 550 | 170 | 325 |
| 6.28 | 120 | 245 | 465 | 220 | 460 | 230 | 470 | 165 | 290 |
| 9.95 | 120 | 230 | 415 | 205 | 400 | 210 | 410 | 155 | 265 |
| 15.8 | 120 | 215 | 375 | 190 | 355 | 195 | 370 | 150 | 245 |
| 25 | 120 | 200 | 340 | 180 | 320 | 185 | 335 | 145 | 225 |
| 39.6 | 120 | 190 | 305 | 170 | 290 | 175 | 305 | 140 | 210 |
| 62.8 | 120 | 185 | 280 | 160 | 265 | 165 | 275 | 135 | 200 |
| 99.5 | 120 | 175 | 260 | 155 | 240 | 155 | 250 | 125 | 185 |

EXAMPLE 29

A blend of 70% (by wt.) polystyrene (280,000 Mw:Aldrich) and 30% Vinex 2025 PVOH was extruded in a 1" Killion extruder at 200° C., oriented by hot drawing, chopped and agitated in water. After PVOH extraction, a ultra-fine fibrous product was recovered and dried.

EXAMPLE 30

A blend of 50% (by wt.) Vinex 2025 PVOH and 50% styrene/acrylonitrile copolymer (30% AN content:- Scientific Polymer Products; Cat. #495) was prepared in a 1" Killion extruder at 200°-210° C., oriented by hot drawing, chopped and agitated in water. After extraction of PVOH, 0.2 to 0.3 m fibers were observed based on scanning electron microscopy studies.

EXAMPLE 31

A blend of 50% by wt. Vinex 2025 PVOH and 50% by wt. of a polystyrene foam product (Cushionpak TM polystyrene produced by CPI Packaging Co., Marlboro, N.J.) was extruded in a 1" Killion extruder at 180°-200° C. Prior to extrusion, the foam was heated to 150° C., allowed to shrink, ground-up and mixed with Vinex 2025 PVOH pellets. The extrusion RPM was 14 and the product rate was 900 grams/hour. The extrudate was oriented, pelletized, and agitated in water to extract the poly(vinyl alcohol). After several extractions, the resultant dried product was ultra-fine fibers of polystyrene.Example 32

EXAMPLE 32

A blend of 75% of the styrene/acrylonitrile copolymer of example 30 and 25% (by wt.) of Vinex 2025 PVOH was extruded in a 1" Killion extruder, oriented by hot drawing, pelletized, agitated in water followed by extraction of poly(vinyl alcohol). The resultant product was a fiber mass of styrene/acrylonitrile ultra-fine fibers.

Having thus described the present invention, what is now deemed appropriate for Letters Patent is set out in the following appended claims.

What is claimed is:

1. A process for the production of ultra-fine polymeric fibers said process comprising:
    mixing granular thermoplastic polymeric material with thermoplastic poly(vinyl alcohol) wherein said thermoplastic poly(vinyl alcohol) is at least 60% hydrolyzed, extruding the resultant mixture through a die, followed by subjecting the mixture to an orientation step, chopping the extruded oriented material into desired lengths, and thereafter extracting the thermoplastic poly(vinyl alcohol) to produce ultra-fine polymeric fibers wherein the above steps are performed consecutively in the order listed.

2. The process of claim 1 wherein said thermoplastic polymeric material is a polyolefin.

3. The process of claim 2 wherein said thermoplastic polymeric material is polypropylene.

4. The process of claim 3 wherein said thermoplastic polymeric material is polystyrene.

5. The process of claim 1 wherein said thermoplastic polymeric material is post-consumer polymeric scrap.

6. The process of claim 5 wherein said post-consumer polymeric scrap comprises polymeric material selected from the group consisting of polyolefins, polystyrene, poly(ethylene terephthalate), poly(vinyl chloride), poly(vinylidene chloride), ethylene/vinyl alcohol copolymers, cellulosic products, high acrylonitrile copolymers and mixtures thereof.

7. The process of claim 1 wherein said granular thermoplastic polymeric material is formed by grinding polymeric material in liquid nitrogen.

8. The process of claim 1 wherein a defoaming agent is added to the polymeric material/poly(vinyl alcohol) mixtures.

9. The process of claim 8 wherein said defoaming agent is an ethylene oxide/propylene oxide based block copolymer.

10. The process of claim 1 wherein the poly(vinyl alcohol) is extracted from the polymeric fibers by agitation in a water slurry.

11. The process of claim 1 wherein the extracted poly(vinyl alcohol) is recycled and reused in this process.

12. The process of claim 1 wherein the thermoplastic poly(vinyl alcohol) is formed by adding a plasticizer to poly(vinyl alcohol).

13. The process of claim 12 wherein said plasticizer is glycerine.

14. The process of claim 1 wherein said thermoplastic poly(vinyl alcohol) is from 72-99% hydrolyzed.

15. The process of claim 1 wherein said thermoplastic poly(vinyl is from 78-94% hydrolyzed.

* * * * *